Feb. 21, 1956 T. A. MILLER ET AL 2,735,137
MECHANICAL EXTRACTING APPARATUS FOR STRIPPING FLEXIBLE
HOLLOW ARTICLES FROM REENTRANT MOLD CAVITIES
Filed March 21, 1955

INVENTORS
THEODORE A. MILLER &
THEODORE A. MILLER JR.
BY

Oldham & Oldham
ATTORNEYS

United States Patent Office 2,735,137
Patented Feb. 21, 1956

2,735,137

MECHANICAL EXTRACTING APPARATUS FOR STRIPPING FLEXIBLE HOLLOW ARTICLES FROM REENTRANT MOLD CAVITIES

Theodore A. Miller and Theodore A. Miller, Jr., Cuyahoga Falls, Ohio

Application March 21, 1955, Serial No. 495,610

7 Claims. (Cl. 18—2)

This invention relates to apparatus for stripping flexible hollow molded articles from reentrant mold cavities in which they have been formed, and is especially useful in removing articles formed in such molds by deposit from a dispersion of plastic thermo-setting material, although the invention may also be used for removing molded articles of material such as rubber from their mold cavities.

In forming flexible hollow articles, such as the heads, body, arms and legs of dolls, from thermo-setting plastic material, it is desirable to provide an article free from mold marks and it has been proposed to form such articles by deposit from plastisol or a dispersion of thermo-setting plastic material within a substantially closed one-piece mold cavity, herein referred to as a reentrant mold cavity.

Such reentrant mold cavities have one small opening thereto adapted to be closed by a plug member, and, as the opening is much smaller than the greatest dimension of the cavity, a difficulty arises in removing the article from the mold.

It is an object of the present invention to provide for gripping the article and withdrawing it from the mold cavity, while bleeding off the air enclosed within the article.

It is a further object to provide for ready insertion of the article-gripping means in the article.

It is a further object to provide for clamping the gripping means mechanically upon the article.

These and other objects will become apparent from the following description, reference being had to the accompanying drawings.

Figure 1:
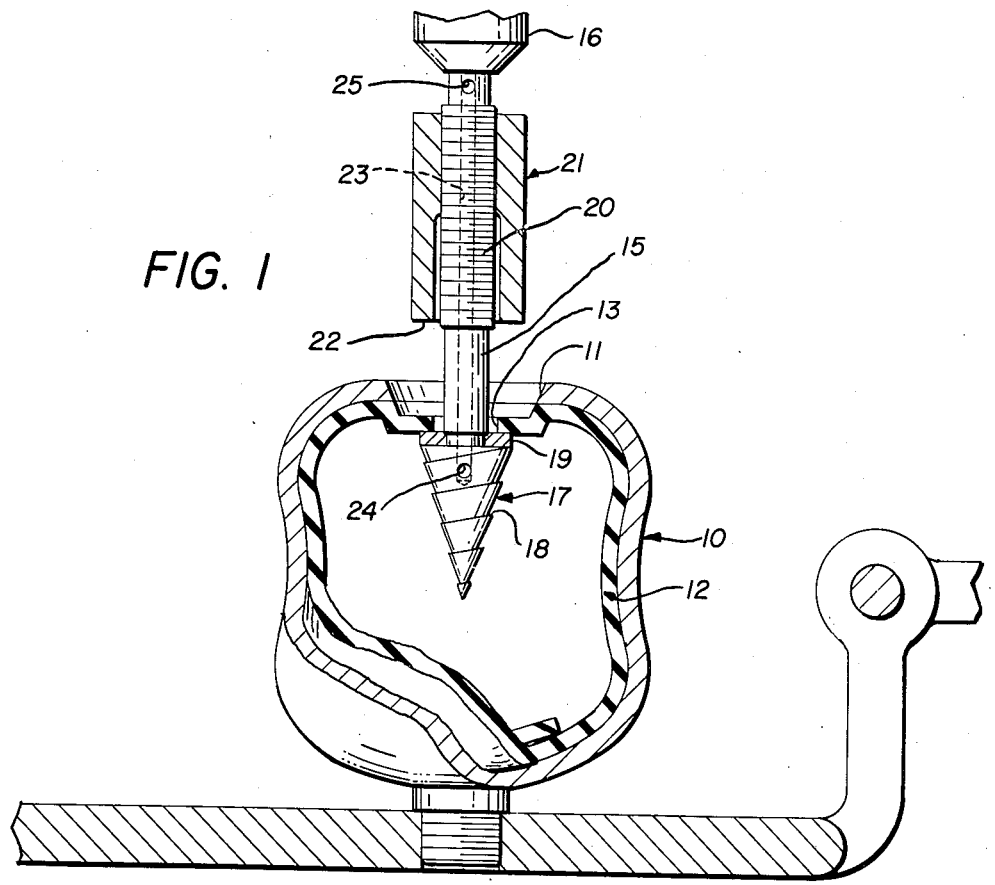
Fig. 1 is a side view of a reentrant mold cavity and its supporting mold plate with the article therein and the article stripping apparatus of this invention entered in the article, portions of the mold and article and stripping apparatus being broken away and portions shown in section.
Figure 2:
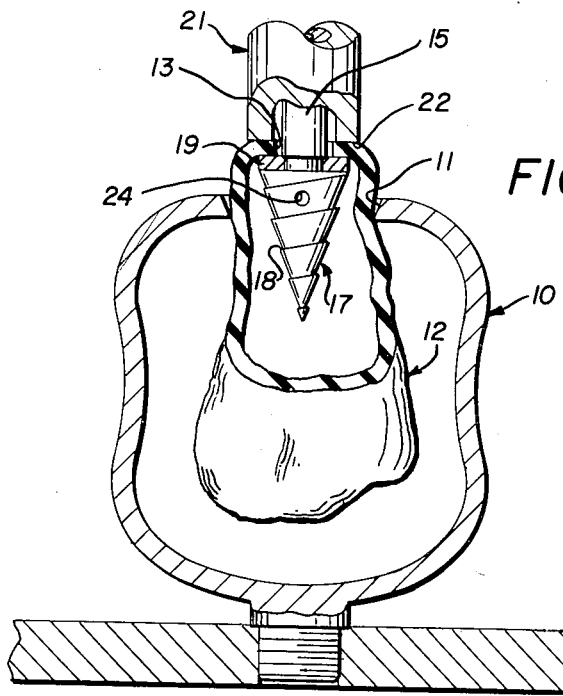
Fig. 2 is a similar view showing the article in partly collapsed condition and gripped by the stripping apparatus.

Referring to the drawings, the numeral 10 designates a reentrant mold cavity having an opening 11 smaller than the remainder of the cavity through which the article 12 must be removed. As shown in Fig. 1, the article conforms to the wall of the mold cavity where it has been formed and partially bridges the opening 11, but has an aperture 13 in alignment with opening 11, but considerably smaller. The aperture 13 may be formed during the molding operation or thereafter in any desired manner, it being understood that during the forming of the article, the opening 11 was closed by a plug (not shown).

The article-stripping apparatus comprises a rotatable spindle 15 of smaller diameter than the aperture 13 and mounted in a holder 16, such as a chuck, whereby it may be rotated in opposite directions, as desired.

Mounted on the anterior end of spindle 15 is a pointed spearhead-like conical clamp member 17 having a coarse-pitched buttress thread 18 of progressively increasing diameter and having its abrupt flank facing away from the point of the conical member. The clamp member is fixed to the spindle 15 so as to be rotated thereby and its large end is of greater diameter than the spindle. An anti-friction disc 19 is rotatably mounted on the spindle facing the flat base of the conical clamp member and is free of the spindle. The arrangement is such that when the point of the conical gripping member is rotated clockwise and held against the article at the aperture 13, it acts as a screw and expands the aperture and enters the article. As the aperture 13 passes beyond the base of the conical clamp member, it contracts and lays over the disc 19.

For engaging the outer surface of the article and clamping it against the disc 19, the spindle 15 has a thread 20, preferably of opposite hand from the thread of the conical clamping member, and a tubular clamp member 21 has an internal thread engaging the same so as to be moved axially along the spindle when the spindle is rotated and the clamp member held against rotation. The clamp member has a clamping face 22 engageable with the portion of the article overlapping the disc 19 and smaller in diameter than the mold opening 11. The arrangement is such that by relative rotation, the clamping member 21 may be advanced along the spindle 15 to clamp and seal the margin of the article about the aperture 13 to the conical clamping member.

The closed article contains air under atmospheric pressure which would prevent withdrawal of the article from the mold. To provide for escape of this air, an axial passage 23 is provided in spindle 15 and connects a side aperture 24 in the conical clamping member 17 to a side aperture 25 in the spindle outside the article.

The operation of the apparatus is as follows: The pointed end of the clamping member 17 is pressed against the aperture 13 of the article while rotated in a direction to screw it through the aperture. This movement causes some of the air in the article to escape through the axial passage of the spindle as the wall of the article is forced toward the bottom of the mold cavity. The wall of the article about aperture 13 contracts as it passes beyond the disc 19. The tubular clamping member is then advanced against the article and where the thread 20 is of opposite hand to the thread 18 this may be accomplished by the operator grasping the clamping member 21 to restrain it from rotating while continuing rotation of spindle 15. When the clamping members grip the article, rotation of the spindle may be discontinued and the article may be withdrawn from the mold cavity by withdrawal of the spindle.

Where the aperture 13 in the article has not been previously formed, the point of the conical clamping member may be formed as a drill for making the aperture.

Modifications may be made without departing from the scope of the invention, as it is defined by the following claims.

We claim:

1. Apparatus for stripping a flexible hollow article having an aperture from a reentrant mold cavity in which it was formed, said apparatus comprising a rotatable spindle, a conical screw-threaded clamping member secured to the end of said spindle for expanding the aperture and entering the article, a second clamping member mounted on said spindle for clamping margins of the article about its aperture to said conical clamping member, and a passage through said conical clamping member and said spindle and communicating with the atmosphere for providing escape of air from the article.

2. Apparatus for stripping a flexible hollow article having an aperture from a reentrant mold cavity in which it was formed, said apparatus comprising a rotatable spindle, a conical screw-threaded clamping member secured to the end of said spindle for expanding the aperture and entering the article, a second clamping member mounted on said spindle for clamping margins of the article about its aperture to said conical clamping member, said second clamping member and said spindle having cooperating means for moving the said second clamping member along said spindle by relative rotation, and a passage through said conical clamping member and said spindle and communicating with the atmosphere for providing escape of air from the article.

3. Apparatus for stripping a flexible hollow article having an aperture from a reentrant mold cavity in which it was formed, said apparatus comprising a rotatable spindle, a conical screw-threaded clamping member secured to the end of said spindle for expanding the aperture and entering the article, a second clamping member mounted on said spindle for clamping margins of the article about its aperture to said conical clamping member, said second clamping member and said spindle having cooperating screw threads for moving the said second clamping member along said spindle by relative rotation thereof, and a passage through said conical clamping member and said spindle and communicating with the atmosphere for providing escape of air from the article.

4. Apparatus for stripping a flexible hollow article from a reentrant mold cavity in which it was formed, said apparatus comprising a rotatable spindle, a conical pointed spearheaded clamping member secured to the end of said spindle for penetrating the wall of the article, said clamping member having a screw thread for advancing it through said wall, a second clamping member movable along said spindle for clamping the wall of the article to said conical clamping member, and a passage through said conical clamping member and said spindle and communicating with the atmosphere for providing escape of air from the article.

5. Apparatus for stripping a flexible hollow article from a reentrant mold cavity as defined by claim 4, in which the conical pointed clamping member has a drill point for forming an initial aperture in the article.

6. Apparatus for stripping a flexible hollow article from a reentrant mold cavity in which it was formed, said apparatus comprising a rotatable spindle for penetrating the wall of the article, said clamping member having a screw thread for advancing it through said wall, a second clamping member movable along said spindle for clamping the wall of the article to said conical clamping member, said second clamping member and said spindle having cooperating means for moving said second clamping member along said spindle to clamp the wall of the article between said clamping members, and a passage through said conical clamping member and said spindle and communicating with the atmosphere for providing escape of air from the article.

7. Apparatus for stripping a flexible hollow article from a reentrant mold cavity in which it was formed, said apparatus comprising a rotatable spindle, a conical pointed spearheaded clamping member secured to the end of said spindle for penetrating the wall of the article, said clamping member having a screw thread for advancing it through said wall, a second clamping member movable along said spindle for clamping the wall of the article to said conical clamping member, said second clamping member and said spindle having cooperating screw threads for moving said second clamping member along said spindle by relative rotation thereof to clamp the wall of the article between said clamping means, and a passage through said conical clamping member and said spindle and communicating with the atmosphere for providing escape of air from the article.

References Cited in the file of this patent
UNITED STATES PATENTS

| 1,455,240 | Cobb | May 15, 1923 |
| 2,099,843 | Connell | Nov. 23, 1937 |
| 2,217,213 | Bratring | Oct. 8, 1940 |